United States Patent
Pettersson

(10) Patent No.: US 11,115,994 B2
(45) Date of Patent: Sep. 7, 2021

(54) TRIGGERING/INITIATING BACKOFF PROCEDURE(S) BASED ON CONGESTION INDICATION(S) TO DEFER SCHEDULING REQUEST TRANSMISSION

(71) Applicant: Telefonaktiebolaget LM Ericsson (publ), Stockholm (SE)

(72) Inventor: Jonas Pettersson, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 152 days.

(21) Appl. No.: 16/075,273

(22) PCT Filed: Feb. 17, 2016

(86) PCT No.: PCT/SE2016/050120
§ 371 (c)(1),
(2) Date: Aug. 3, 2018

(87) PCT Pub. No.: WO2017/142446
PCT Pub. Date: Aug. 24, 2017

(65) Prior Publication Data
US 2019/0045524 A1 Feb. 7, 2019

(51) Int. Cl.
*H04W 72/12* (2009.01)
*H04W 74/08* (2009.01)
(Continued)

(52) U.S. Cl.
CPC ... *H04W 72/1252* (2013.01); *H04W 28/0278* (2013.01); *H04W 28/0284* (2013.01);
(Continued)

(58) Field of Classification Search
CPC ......... H04W 72/1252; H04W 74/0833; H04W 74/0891; H04W 74/0816; H04W 74/02;
(Continued)

(56) References Cited

U.S. PATENT DOCUMENTS

2002/0099854 A1* 7/2002 Jorgensen ............... H04L 1/20
709/249
2004/0032877 A1* 2/2004 Chuah ............... H04W 74/0875
370/444

(Continued)

FOREIGN PATENT DOCUMENTS

WO 2011087406 A1 7/2011

OTHER PUBLICATIONS

Cheng et al. Modeling and Analysis of an Extended Access Barring Algorithm for Machine-Type Communications in LTE-A Networks, 2015, IEEE vol. 14, Issue: 6, 2956-2962.*

(Continued)

*Primary Examiner* — Ajit Patel
*Assistant Examiner* — Wilfred Thomas
(74) *Attorney, Agent, or Firm* — Sage Patent Group

(57) ABSTRACT

There is provided a method and corresponding device for transmitting a congestion indication to a group of wireless communication devices for synchronized triggering of backoff procedures in the wireless communication devices. A purpose of the synchronized triggering of the backoff procedures may be to enable deferring, in each of the wireless communication devices, transmission of scheduling request(s) until one or more backoff procedures in the considered wireless device is completed. In this way, the proposed technology provides efficient load control related to scheduling requests and/or enables a reduction of the average response time between scheduling request and grant.

4 Claims, 14 Drawing Sheets

(51) Int. Cl.
  *H04W 28/02* (2009.01)
  *H04W 56/00* (2009.01)
  *H04W 72/14* (2009.01)
  *H04W 74/02* (2009.01)
  *H04W 48/12* (2009.01)
  *H04W 48/06* (2009.01)
  *H04L 12/841* (2013.01)
  *H04L 12/851* (2013.01)
  *H04W 80/02* (2009.01)

(52) U.S. Cl.
  CPC ......... *H04W 48/06* (2013.01); *H04W 48/12* (2013.01); *H04W 56/001* (2013.01); *H04W 72/1242* (2013.01); *H04W 72/1247* (2013.01); *H04W 72/14* (2013.01); *H04W 74/02* (2013.01); *H04W 74/0816* (2013.01); *H04W 74/0833* (2013.01); *H04W 74/0891* (2013.01); *H04L 47/24* (2013.01); *H04L 47/28* (2013.01); *H04W 80/02* (2013.01)

(58) Field of Classification Search
  CPC ............. H04W 72/14; H04W 72/1247; H04W 72/1242; H04W 56/001; H04W 28/0278; H04W 48/12; H04W 48/06; H04W 28/0284; H04W 80/02; H04L 47/24; H04L 47/28
  See application file for complete search history.

(56) References Cited

U.S. PATENT DOCUMENTS

| | | | | |
|---|---|---|---|---|
| 2009/0103501 | A1* | 4/2009 | Farrag | H04W 74/02 370/337 |
| 2009/0207730 | A1* | 8/2009 | Stamoulis | H04W 72/12 370/230.1 |
| 2010/0232364 | A1* | 9/2010 | Hsu | H04W 74/085 370/328 |
| 2011/0170408 | A1* | 7/2011 | Furbeck | H04W 28/0289 370/230 |
| 2011/0211447 | A1* | 9/2011 | Wang | H04W 72/1289 370/230 |
| 2011/0274040 | A1* | 11/2011 | Pani | H04W 74/006 370/328 |
| 2012/0051297 | A1* | 3/2012 | Lee | H04W 74/006 370/329 |
| 2012/0082099 | A1* | 4/2012 | Bienas | H04W 74/008 370/329 |
| 2013/0034059 | A1* | 2/2013 | Lee | H04W 74/006 370/328 |
| 2013/0040678 | A1* | 2/2013 | Lee | H04W 72/1252 455/509 |
| 2013/0073746 | A1* | 3/2013 | Singh | H04W 52/0219 709/248 |
| 2013/0077484 | A1* | 3/2013 | Zhao | H04W 4/70 370/230 |
| 2013/0272148 | A1* | 10/2013 | Fong | H04L 5/0001 370/252 |
| 2014/0220987 | A1* | 8/2014 | Wu | H04W 28/0215 455/450 |
| 2015/0023166 | A1* | 1/2015 | Kim | H04W 28/0289 370/230 |
| 2015/0230245 | A1* | 8/2015 | Choi | H04W 72/0446 370/329 |
| 2015/0230267 | A1* | 8/2015 | Lee | H04W 74/0875 370/336 |
| 2016/0374104 | A1* | 12/2016 | Watfa | H04W 4/80 |
| 2019/0045524 | A1* | 2/2019 | Pettersson | H04W 72/14 |

OTHER PUBLICATIONS

John S. Vardakas*, Nizar Zorba, Charalabos Skianis‡, and Christos V. Verikoukis, Performance Analysis of M2M Communication Networks for QoS-differentiated Smart Grid Applications 2015, IEEE.*

International Search Report and Written Opinion dated Oct. 14, 2016 for International Application No. PCT/SE2016/050120 filed on Feb. 17, 2016, consisting of 13-pages.

3GPP TSG-RAN2 Meeting #93 R2-161639; Title: "Use of RA back-off indicator"; Agenda Item: 7.16.3.1; Source: Ericsson; Document for: Discussion and Decision; Location and Date: St. Julian, Malta Feb. 15-19, 2016, consisting of 3-pages.

3GPP TSG-RAN WG2#93 R2-161406; Title: "E-Mail Discussion and companies view on the need for MAC BI"; Agenda Item: 7.16.3.1; Source: Vodafone; Document for: Discussion; Location and Date: Malta Feb. 15-19, 2016, consisting of 3-pages.

3GPP TR 23.888 V11.0.0; 3rd Generation Partnership Project; Technical Specification Group Services and System Aspects; System improvements for Machine-Type Communications (MTC) (Release 11); Sep. 2012, consisting of 165-pages.

Tiago P. C. de Andrade, et al. Title: "Random Access Mechanism for RAN Overload Control in LTE/LTE-A Networks"; IEEE ICC 2015—Communications QoS, Reliability and Modeling Symposium, Jun. 2015, consisting of 6-pages.

* cited by examiner

TRIGGERING/INITIATING BACKOFF PROCEDURE(S) BASED ON CONGESTION INDICATION(S) TO DEFER SCHEDULING REQUEST TRANSMISSION

CROSS-REFERENCE TO RELATED APPLICATIONS

This application is a Submission Under 35 U.S.C. § 371 for U.S. National Stage Patent Application of International Application Number: PCT/SE2016/050120, filed Feb. 17, 2016 entitled "TRIGGERING/INITIATING BACKOFF PROCEDURE(S) BASED ON CONGESTION INDICATION(S) TO DEFER SCHEDULING REQUEST TRANSMISSION," the entirety of which is incorporated herein by reference.

TECHNICAL FIELD

The proposed technology generally relates to wireless communications, and more specifically to a method for enabling load control related to scheduling requests for uplink grants in a wireless communication system, and a corresponding device, uplink scheduler and network node, and a method performed by a wireless communication device, and a corresponding wireless communication device, as well as corresponding computer programs and computer-program products and apparatuses.

BACKGROUND

In modern wireless communication systems, such as LTE, the uplink (as well as the downlink) transmissions are normally scheduled by the network.

A general problem associated with a scheduled uplink is how to get information about which wireless communication devices, such as UEs, that have data waiting for transmission, how much data, and how important it is to schedule that data. The information must in some way be conveyed from the wireless communication devices to the scheduler, for example by means of Buffer Status Reports (BSR) and/or Scheduling Requests (SR).

Precise and up-to-date scheduling information allows more accurate scheduling decisions, and can help to optimize the use of radio resources and to improve capacity. However, the accuracy of the information provided by the wireless communication devices may for example be limited by the granularity of the BSR reports, and/or by the frequency of the SR and/or BSR transmissions and/or by the delay between the reception of the SR or BSR and the scheduling decision and grant. By way of example, a high intensity of SR transmissions will cause a high average response delay and can also cause overload situations on the channel(s) over which scheduling requests are conveyed. Processing limitations may also come into play, as will be explained later on.

This problem is expected to increase in the future since there will be increased bit-rates on the shared channel and new use cases are expected which include many short transmissions, some with extreme delay requirements.

SUMMARY

It is an object to provide a method for enabling load control related to scheduling requests for uplink grants in a wireless communication system.

It is also an object to provide a corresponding method performed by a wireless communication device in a wireless communication system.

Another object is to provide a device configured to enable load control related to scheduling requests for uplink grants in a wireless communication system.

Yet another object is to provide an uplink scheduler comprising such a device.

Still another object is to provide a network node comprising such a device.

It is also an object to provide a wireless communication device in a wireless communication system.

Another object is to provide corresponding computer programs and computer-program products.

Yet another object is to provide an apparatus for enabling load control related to scheduling requests for uplink grants in a wireless communication system.

Still another object is to provide an apparatus for supporting operation of a wireless communication device in a wireless communication system.

These and other objects are met by embodiments of the proposed technology.

According to a first aspect, there is provided a method for enabling load control related to scheduling requests for uplink grants in a wireless communication system. The method comprises transmitting a congestion indication to a group of wireless communication devices for synchronized triggering of backoff procedures in the wireless communication devices.

According to a second aspect, there is provided a method performed by a wireless communication device in a wireless communication system. The method comprises receiving a congestion indication, and initiating a backoff procedure based on the received congestion indication to defer transmission of scheduling request(s) until the backoff procedure is completed.

According to a third aspect, there is provided a device configured to enable load control related to scheduling requests for uplink grants in a wireless communication system. The device is configured to transmit a congestion indication to a group of wireless communication devices for synchronized triggering of backoff procedures in the wireless communication devices.

According to a fourth aspect, there is provided an uplink scheduler comprising a device according to the third aspect.

According to a fifth aspect, there is provided a network node comprising a device according to the third aspect.

According to a sixth aspect, there is provided a wireless communication device in a wireless communication system. The wireless communication device is configured to receive a congestion indication. The wireless communication device is also configured to initiate a backoff procedure based on the received congestion indication to defer transmission of scheduling request(s) until the backoff procedure is completed.

According to a seventh aspect, there is provided a computer program comprising instructions, which when executed by at least one processor, cause the at least one processor to:
  generate a congestion indication, and
  output the congestion indication for transmission to a group of wireless communication devices for synchronized triggering of backoff procedures in the wireless communication devices.

According to an eighth aspect, there is provided a computer program comprising instructions, which when executed by at least one processor, cause the at least one processor to:
  read a congestion indication, and
  initiate a backoff procedure based on the congestion indication to defer transmission of scheduling request(s) until the backoff procedure is completed.

According to a ninth aspect, there is provided a computer-program product comprising a computer-readable medium having stored thereon a computer program according to the seventh or eighth aspect.

According to a tenth aspect, there is provided an apparatus for enabling load control related to scheduling requests for uplink grants in a wireless communication system. The apparatus comprises a generating module for generating a congestion indication, and an output module for outputting the congestion indication for transmission to a group of wireless communication devices for synchronized triggering of backoff procedures in the wireless communication.

According to an eleventh aspect, there is provided an apparatus for supporting operation of a wireless communication device in a wireless communication system. The apparatus comprises an input module for receiving a congestion indication, and an initiating module for initiating a backoff procedure based on the received congestion indication to defer transmission of scheduling request(s) until the backoff procedure is completed.

An advantage is that the proposed technology enables efficient load control related to scheduling requests and/or enables a reduction of the average response time between scheduling request and grant.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

For a better understanding of the proposed technology, it may be useful to begin with a brief overview of the general grant-related signalling between a network node and an associated wireless communication device.

Figure 1A:
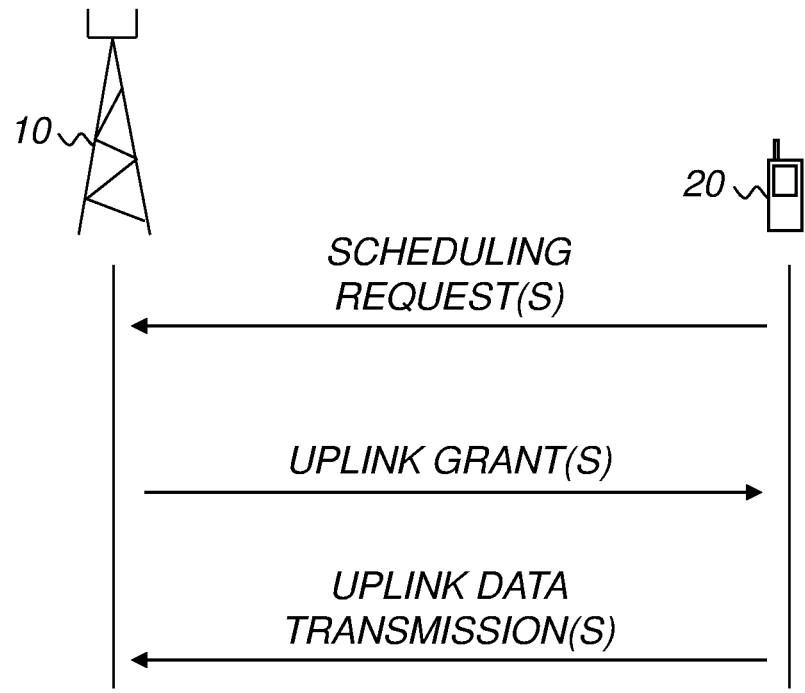
FIG. 1A is a schematic signaling diagram illustrating an example of signaling between a network node and a wireless communication device related to grant-based uplink data transmissions.

FIG. 1A is a schematic signaling diagram illustrating an example of signaling between a network node 10 and a wireless communication device 20 related to grant-based uplink data transmissions.

As previously explained, the wireless communication device 20 may transmit one or more scheduling requests to the network node 10, which based on the received scheduling request(s) takes a decision as to whether and/or when uplink grant(s) should be given to the wireless communication device. The uplink grant(s) is/are transmitted to the wireless communication device 20, which may then perform uplink data transmissions using the granted uplink resources.

It may also be useful to describe the basic scheduling principles in modern wireless networks such as LTE of today, and some of the problems associated therewith.

In LTE, for example, scheduling is modeled in the Medium Access Control (MAC) layer and resides in the eNodeB (eNB). The scheduler assigns radio resources, also called resource blocks (RB), for the downlink (assignments) as well as for the uplink (grants) using the Physical Downlink Control Channel (PDCCH).

For uplink scheduling, the eNB needs information about the current state of the buffers in the terminal, i.e. if and how much data the terminal has in its priority queues. This information is sent from the UE to the eNB either as a 1-bit scheduling request (SR) or by a buffer status report (BSR). BSRs are transmitted on the data channel (PUSCH) mostly together with user data. SRs are either transmitted on the RACH channel (RA-SR) or on dedicated resources on the PUCCH (Dedicated SR, D-SR) if such resources are available. The PUCCH resources for dedicated SR are assigned and revoked by the eNB through Radio Resource Control (RRC). In addition, the resources are autonomously revoked when the UE loses UL synchronization.

For example, buffer status reporting is used by the UE to report to the eNB the amount of data stored in its buffers for transmission. The eNB uses these reports to allocate resources to the UE, and to prioritize resource allocation between different UEs.

The UE triggers a Regular BSR and Scheduling Request (SR) when uplink data becomes available for transmission and if this data belongs to a Logical Channel Group (LCG) (or radio bearer group) with higher priority than those for which data already existed in the buffer or if the UE buffers were empty just before this new data became available for transmission.

An SR is either sent on the RACH (an RA-SR) or on a dedicated resource on PUCCH (a D-SR). A D-SR is typically used when the UE uplink is time synchronized. The purpose is to enable UE to rapidly request resources for uplink data transmission. In 3GPP, for example, a dedicated solution for the scheduling request has been agreed. For the dedicated approach, each active user is assigned a dedicated channel for performing the scheduling request. The benefit with this method is that no UE ID has to be transmitted explicitly, since the UE is identified by the channel used. Furthermore, no intra-cell collisions will occur in contrast to the contention based approach.

The D-SR is repeatedly transmitted on consecutive SR opportunities on PUCCH until the UE receives an UL grant on PDCCH. The transmission is stopped at least when PUCCH resources are released and/or UL synch is lost even if the UE has not received any UL grant on PDCCH. After stopping transmission on the D-SR, the UE transmits on the RA-SR (i.e. accesses the system via RACH).

The Random Access Scheduling Request (RA-SR) is used when the UE has lost UL synchronization or if it has no D-SR resources.

Other means to transmit scheduling requests are also possible. A resource could be assigned to multiple UEs with a contention based access scheme (similar to random access, but synchronized). Additional data could further be transmitted together with the scheduling requests, e.g. a complete buffer status report and/or user data.

Mechanisms to include more information in the SR transmission to indicate for example a priority are known. WO 2011/087406 for example, describes a way to indicate priority while still using only a 1-bit D-SR-channel.

The concept of using a backoff is common in MAC-procedures that are based on contention, e.g. random access or carrier sense multiple access (CSMA). The general principle here is to perform a backoff procedure after a failed attempt to transmit on the shared channel, e.g. not receiving an acknowledgement.

The fundamental MAC-technique of IEEE 802.11 is based on CSMA: If the channel is busy, the MAC waits until the medium becomes idle, then defers for an extra time interval, called the DCF Interframe Space (DIFS). If the channel stays idle during the DIFS deference, the MAC then starts the backoff process by selecting a random backoff counter (or BC). For each slot time interval, during which the medium stays idle, the random BC is decremented. When the BC reaches zero, the frame is transmitted. On the other hand, when a frame arrives at the head of the queue, if the MAC is in either the DIFS deference or the random backoff process the processes described above are applied again. That is, the frame is transmitted only when the random backoff has finished successfully. When a frame arrives at an empty queue with no on-going backoff process and the medium has been idle longer than the DIFS time interval, the frame is transmitted immediately. The maximum length of the random backoff is increased every time a transmission fails.

The use of a backoff in combination with LTE D-SR is described in US20150230267A1. The principle here is that a UE receives a backoff parameter and selectively applies the received backoff parameter, depending on what triggered the SR.

The inventor has realized that with the current approach in LTE, the triggering of an SR is independent of the load on the channel. It can neither take into account the priority of the data that triggered the event.

When a high number of SRs are triggered in a given time period, this has bad consequences: First a high load on the channel that is used to convey SR may lead to SR reception errors. Secondly the scheduler can't schedule all the UEs with triggered SR on the shared channel. Since no knowledge of the cause is available this may lead to long delays for high priority data which can cause bad service quality as well as radio link failures. The latter can for example occur when the data is handover signaling.

In WO 2011/087406 a partial solution, i.e. a solution to the prioritization problem is proposed. This solution and other solutions that transmits priority information over the D-SR channel can help the scheduler to decide which of the requesting UEs to serve first, but does not address the problem of load on the SR channel. The solution in WO 2011/087406 may further introduce extra delay in the process since the SR-channel must be observed during many frames in order to determine the priority.

The mechanism described in US20150230267A1 does a backoff or not based on the type of data. The backoff is started when the scheduling request is triggered and the transmission take place when the backoff has completed. The effect of this is to shift the transmission of some requests to a later time. So except for a short time period immediately after the reception of the backoff parameter, the only effect of this is to introduce extra delay between the triggering and the transmission. Assuming a steady influx of requests, the number of transmitted SR within a given period will not change, and hence the average response time for a SR triggered by prioritized access will not be shorter.

So to make use of the proposed mechanism, the backoff parameter must be configured exactly at the time of the congestion. The triggering of scheduling requests cannot be predicted (it this was possible they wouldn't be needed), so to be effective the backoff must be configured in all UEs that potentially could send a scheduling request. When the congestion is over, the backoff parameter must be reconfigured again or else there will be unnecessary delays and it will not be possible to configure the backoff again to get the wanted effect at the next congestion. The amount of radio resources required to configure all UEs, especially if more than one priority level is wanted, will be a problem in a congested situation.

Figure 1B:
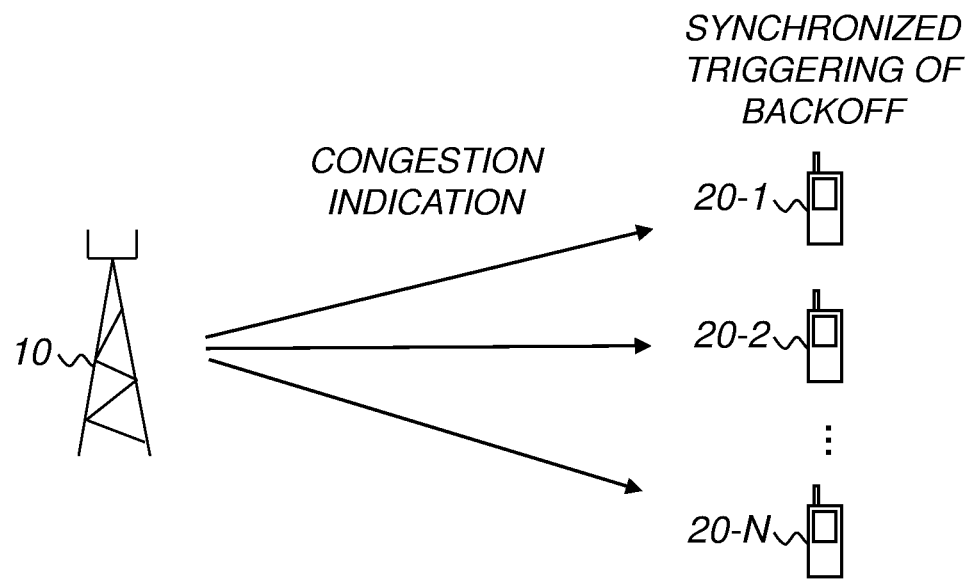
FIG. 1B is a schematic diagram illustrating an example of transmitting a congestion indication to a group of wireless communication devices according to an embodiment.

According to an aspect of the proposed technology, a basic idea is to transmit a congestion indication to a group of wireless communication devices, as illustrated in FIG. 1B, for synchronized triggering of backoff procedures in the wireless communication devices.

Figure 2:
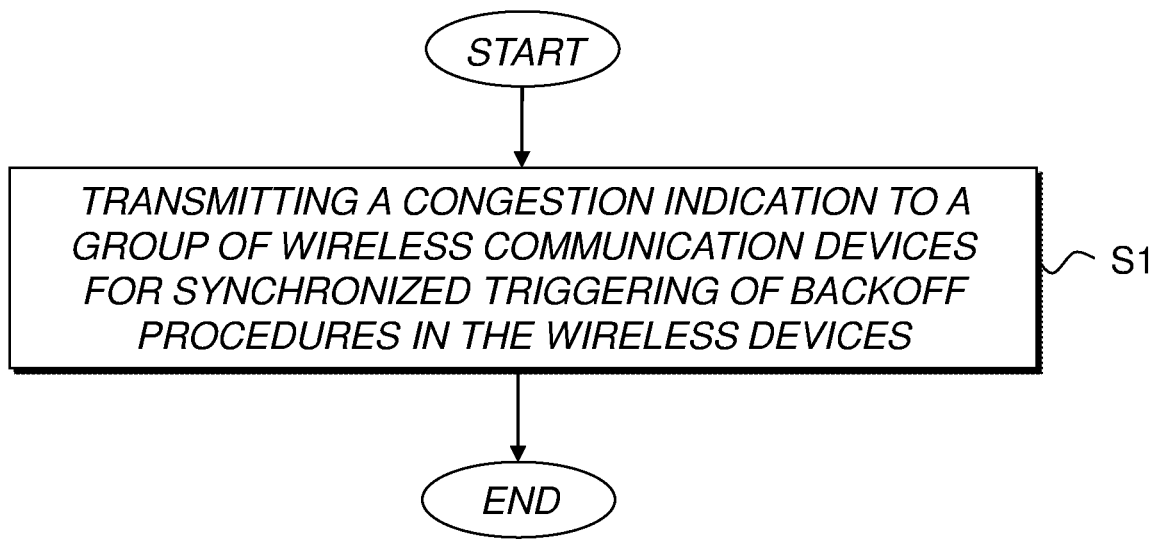
FIG. 2 is a schematic flow diagram illustrating an example of a method for enabling load control related to scheduling requests for uplink grants in a wireless communication system according to an embodiment.

FIG. 2 is a schematic flow diagram illustrating an example of a method for enabling load control related to scheduling requests for uplink grants in a wireless communication system according to an embodiment.

Basically, the method comprises the step S1 of transmitting a congestion indication to a group of wireless communication devices for synchronized triggering of backoff procedures in the wireless communication devices.

A purpose of the synchronized triggering of the backoff procedures may be to enable deferring, in each of the wireless communication devices, transmission of scheduling request(s) until one or more backoff procedures in the considered wireless device is completed.

In this way, the proposed technology provides efficient load control related to scheduling requests and/or enables a reduction of the average response time between scheduling request and grant, as will be explained below.

The process from the time that a wireless communication device such as a terminal knows that it wants to use the shared channel until the scheduler grants access generally includes multiple steps:

Scheduling request (SR) trigger→SR transmission→Grant transmission→Data (plus BSR) transmission on shared channel.

This will then typically be followed by more grants and data transmissions based on the information in the buffer status report, but now the scheduler knows how important it is to schedule the data.

Since the scheduler does not know the priority of the access until the data has been received the time between SR trigger and data plus BSR transmission can become a problem for the overall responsiveness of the system as perceived by the end user.

Congestion in any of the above channels that are involved can cause a long overall response time. Processing limitations may also come into play, e.g. there may be a limit on the number of uplink shared channel receptions that can be processed in each sub-frame. The load on the scheduling request channels (e.g. PUCCH and RACH) cannot be directly controlled by the scheduler.

Therefore an idea would be to control the overall congestion level in the whole chain in order to keep the delay from SR transmission to data (plus BSR) transmission relatively short. This may be done by transmitting a congestion indication to the wireless terminals, which will defer scheduling request transmissions to a later time. The congestion indication may be triggered by anything that impacts the total response time, e.g. high load on RACH or a large number of scheduling requests that are waiting on a grant. In this way the scheduler can control the load on all channels, including the scheduling requests channels with a single mechanism.

Normally, the congestion indication, which is sometimes referred to as a load indication, is thus representative of a load or congestion situation related to scheduling requests.

In a particular example, repeated congestion indications may be transmitted, wherein a length of a time interval between repeated transmissions of congestion indications may be adapted according to a level of congestion.

For example, congestion indications may be transmitted with a shorter length of the time interval when the level of congestion is higher compared to when the level of congestion is lower.

Normally, the group of wireless communication devices share the same uplink resources. In a particular example, the group of wireless communication devices includes at least two wireless communication devices in a cell of the wireless communication system.

The synchronized triggering may be achieved by simultaneously transmitting the congestion indication to the group of wireless communication devices. By way of example, this can be accomplished by multicasting or broadcasting the congestion indication, as will be exemplified in more detail later on.

The congestion indication may for example be a single-bit indication or represented by two or more bits.

The congestion indication may be transmitted, e.g. on a downlink control channel or piggy-backed with one or more downlink data transmissions. For example, the congestion indication may be transmitted on a Physical Downlink Control Channel, PDCCH.

In a particular example, a priority level of an event that triggered a scheduling request may be determined based on the time between the most recently transmitted congestion indication and reception of the scheduling request, and the determined priority level is used for determining when to grant access to a shared uplink channel.

The priority level can thus be used as at least partial input to decide which user(s) should be granted access to the shared uplink channel and in which order. The priority level information for one or more users may be combined with additional information, such as information from buffer status reports, provided such information is available when taking the grant decisions.

In case of multiple priority levels, a solution according to a particular example involves keeping the total response time low for high priority access by deferring lower priority accesses to a later time. They will hence not cause any load on the involved channels. In other words, the high priority accesses will experience a shorter time between scheduling request trigger and scheduling request transmission while low priority accesses will experience a longer delay. Since the scheduler cannot distinguish the different types of requests from each other, it may be beneficial to keep the time from scheduling request reception to data (plus BSR) transmission short for all.

The backoff could also be applied for initial access requests. For an initial access request, the terminal does not typically monitor the channel used for congestion indications when idle. Therefore, a rule could be that the congestion indication channel should be monitored for a certain time before using the random access channel and if a congestion indication is received, the backoff procedure is started as when already connected. This monitoring time could depend on the backoff parameters, which in turn could depend on the priority level of the access request. In general, an initial access request can thus be considered to be equivalent with a scheduling request.

Figure 3:
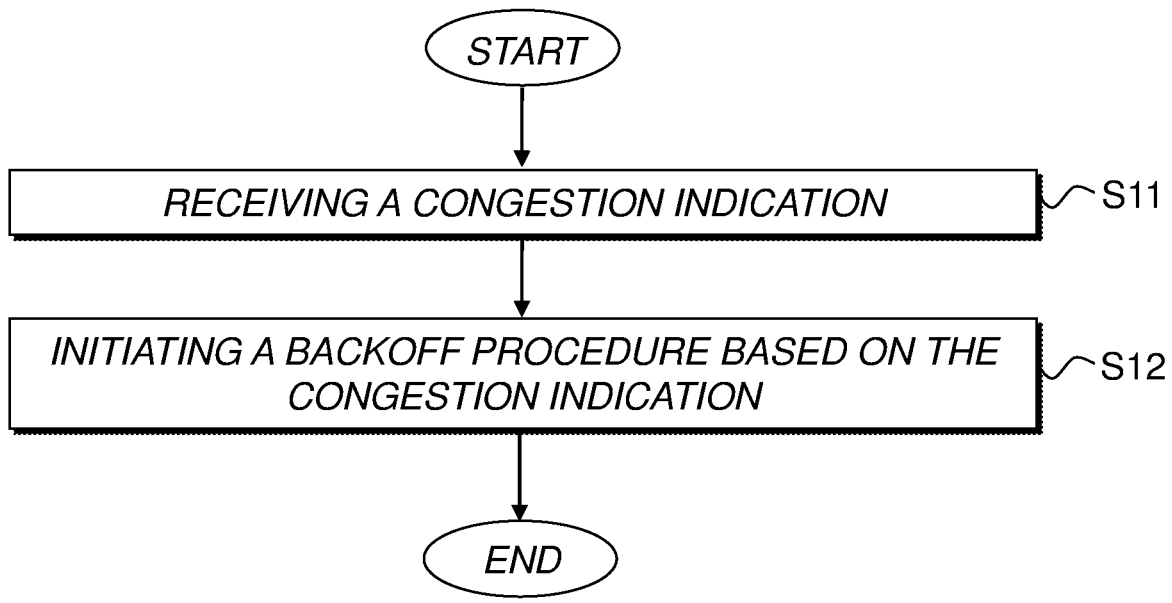
FIG. 3 is a schematic flow diagram illustrating an example of a method performed by a wireless communication device in a wireless communication system according to an embodiment.

FIG. 3 is a schematic flow diagram illustrating an example of a method performed by a wireless communication device in a wireless communication system according to an embodiment.

Basically, the method comprises:

S11: receiving a congestion indication; and

S12: initiating a backoff procedure based on the received congestion indication to defer transmission of scheduling request(s) until the backoff procedure is completed.

Expressed differently, if a scheduling request is triggered, the scheduling request will only be transmitted when no corresponding backoff procedure is on-going.

As previously mentioned, the congestion indication, which is sometimes referred to as a load indication, may be representative of a load or congestion situation related to scheduling requests.

Normally, the backoff procedure comprises a process of backing off from transmission of a scheduling request during a backoff time period, and the backoff procedure is completed when the backoff time period has expired.

In a particular example, at least two backoff procedures are initiated based on the received congestion indication, and the at least two backoff procedures are configured to operate based on different backoff parameters regulating the backoff time period. Illustrative and non-limiting examples of usable backoff parameters will be given later on.

Optionally, the at least two backoff procedures may be associated with different priority levels corresponding to different priority levels of data triggering the scheduling request(s).

As an example, an average backoff time period for a backoff procedure associated with a lower priority level may be longer than an average backoff time period for a backoff procedure associated with a higher priority level. This is preferably accomplished by setting the backoff parameters differently for backoff procedures of different priority levels.

In a particular example, repeated congestion indications may be received and the backoff procedure is restarted based on each congestion indication, as will be exemplified later on.

The congestion indication(s) may be received on a downlink control channel, such as the PDCCH, or received piggybacked with one or more data transmissions.

By way of example, the congestion indication may optionally provide an indication of the level of congestion; not only a "congestion/no congestion" indication. The level of congestion indicated by such a congestion indication may for example be used as input for determining the backoff time period of the backoff procedure(s) or used as input for determining for which backoff procedure(s) the congestion indication applies.

In the following, the proposed technology will be described in more detail with reference to a number of non-limiting examples.

In LTE, for example, when the load on the SR channel(s) is high or many requesting UEs are waiting for grants to use the shared channel, the novel congestion indication makes the UEs aware of this situation. The congestion indication and backoff mechanism will cause requests to wait before transmitting an SR for a time that may depend on the priority of the data.

In addition, as already mentioned, the backoff procedure may be restarted if a further congestion indication is received before it is completed. This means that the scheduler can handle different levels of congestion through the interval between congestion indications. A single congestion indication will shift some lower priority request to a later time, but repeated indications can block requests from being transmitted.

This will control the load on the SR channel(s) and keep the response time between SR and grant low. An access with higher priority will backoff for a shorter period or not at all, and will therefore have a relatively shorter time between data arrival and access.

This provides a very flexible control of the response time for different priorities while keeping the load on the SR channel(s) low.

In a particular embodiment, the broadcasted congestion indication is a single bit and it is not required that the congestion indication is transmitted frequently. So, in this case, the mechanism requires few radio resources on the downlink.

A single congestion indication may also be used regardless of the number of priority levels. The priority levels may be realized through different backoff parameters that can be pre-configured or configured once per session.

The controlled load makes it possible to use the D-SR channel with a shorter period without causing high load, which can reduce the response times further. The proposed mechanism has advantages over the mechanism described in US20150230267A1 both when the congested period is short and when it is long in relation to the backoff parameters.

Figure 4:
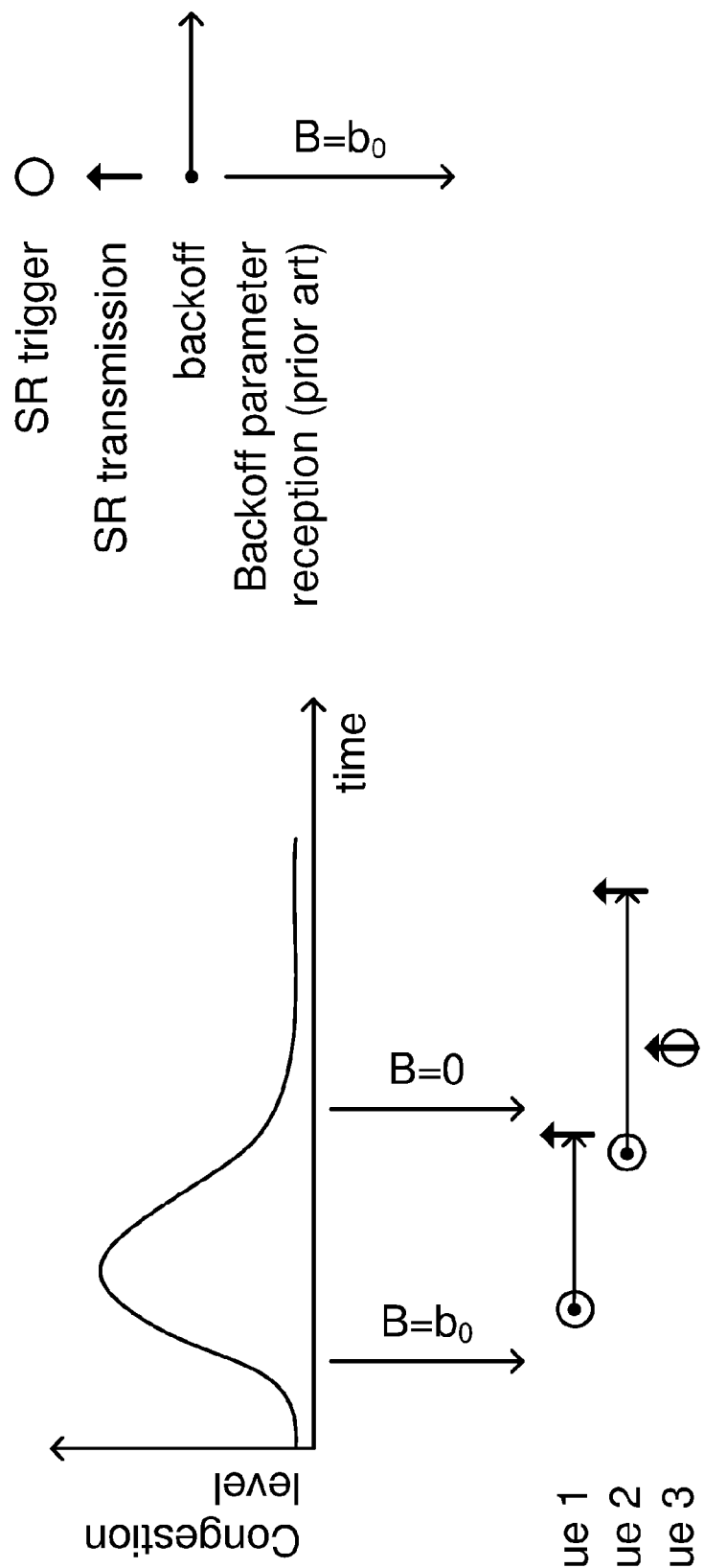
FIG. 4 is a schematic diagram illustrating an example of back-off deferred transmission of scheduling requests during congestion according to prior art.

A short period of congestion handled with the prior art mechanism is schematically illustrated in FIG. 4.

Figure 5:
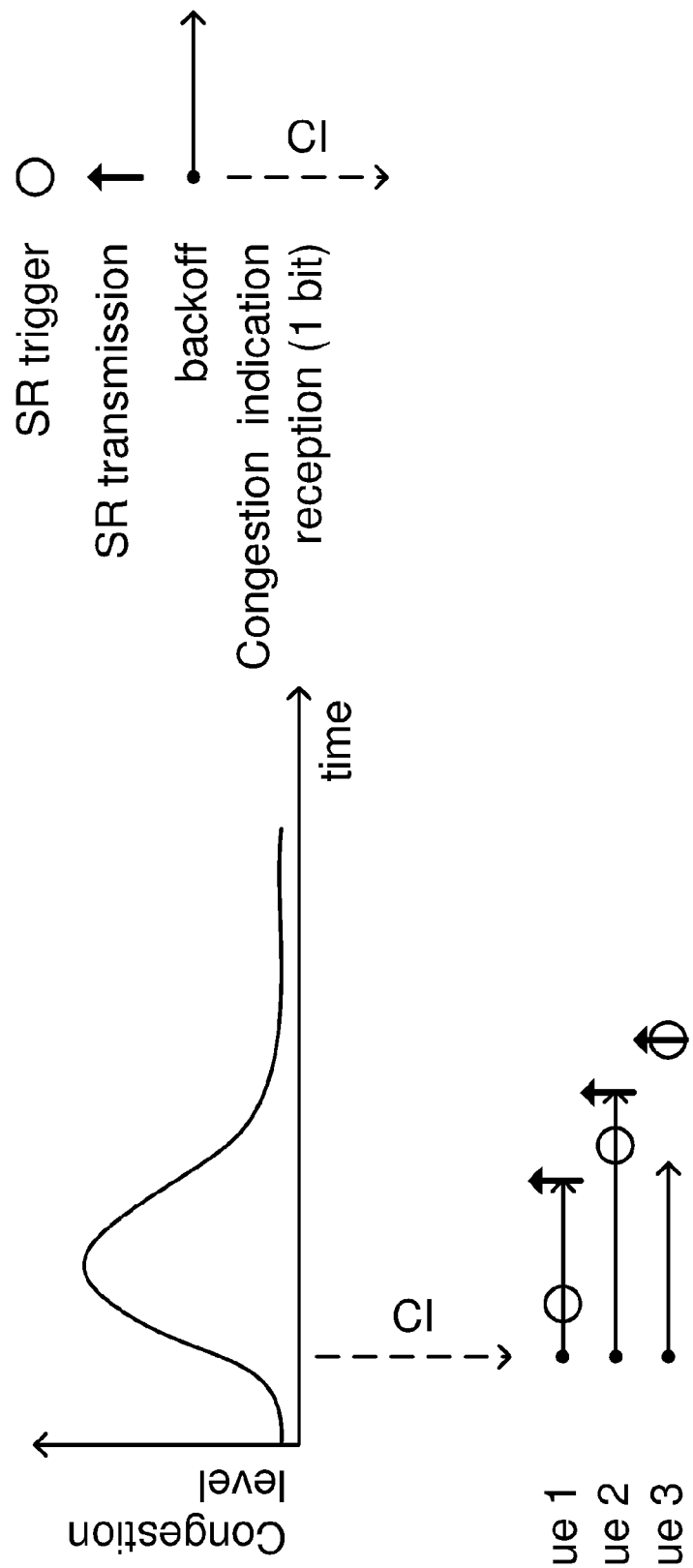
FIG. 5 is a schematic diagram illustrating an example of synchronized triggering of back-off procedures based on a congestion indication according to an embodiment of the proposed technology.

The same situation handled according to an example of the present invention is schematically illustrated in FIG. 5.

The proposed solution (FIG. 5) inhibits scheduling requests during the congested period and not in relation to the random trigger time (FIG. 4). In this particular example, ue2 will experience an unnecessarily long delay with the prior art solution just because it happened to trigger an SR at the end of the congested period.

In addition, only a single bit needs to be transmitted with the proposed solution, while the prior art requires backoff parameters to be transmitted twice (during congestion).

Figure 6:
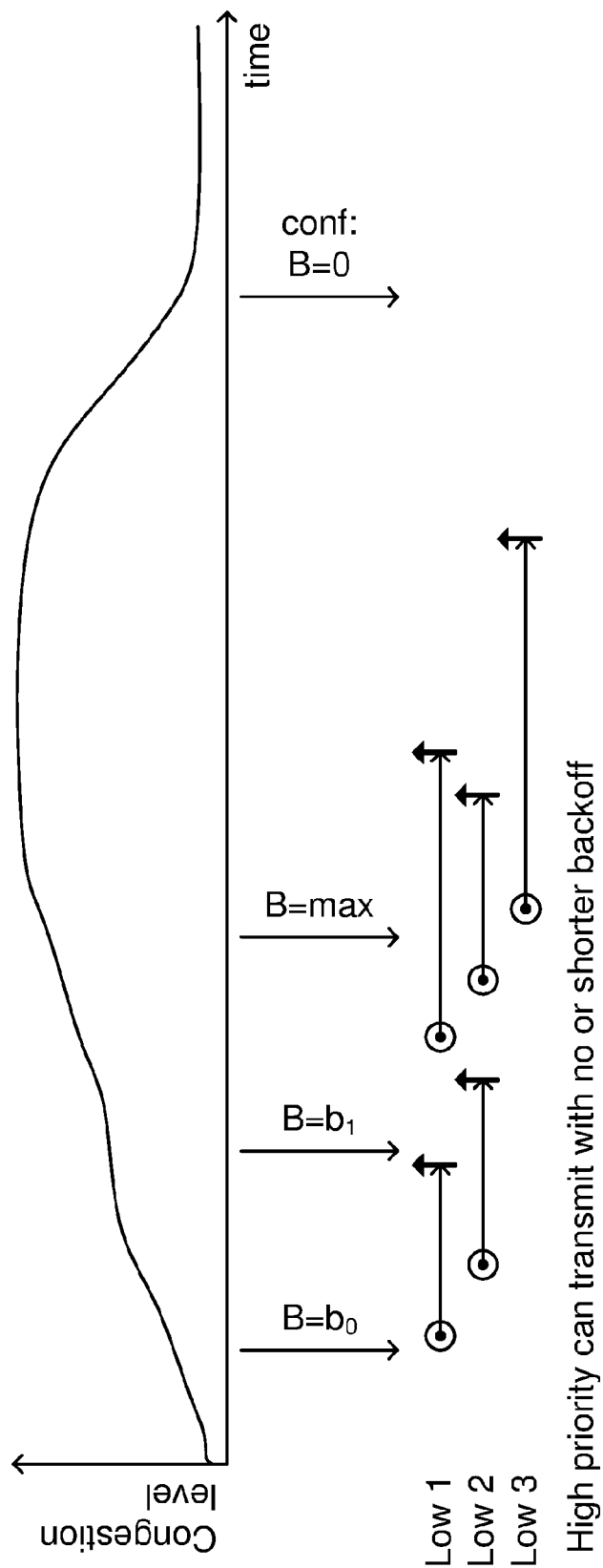
FIG. 6 is a schematic diagram illustrating an example of back-off deferred transmission of scheduling requests during a relatively longer period of congestion according to prior art.
Figure 7:
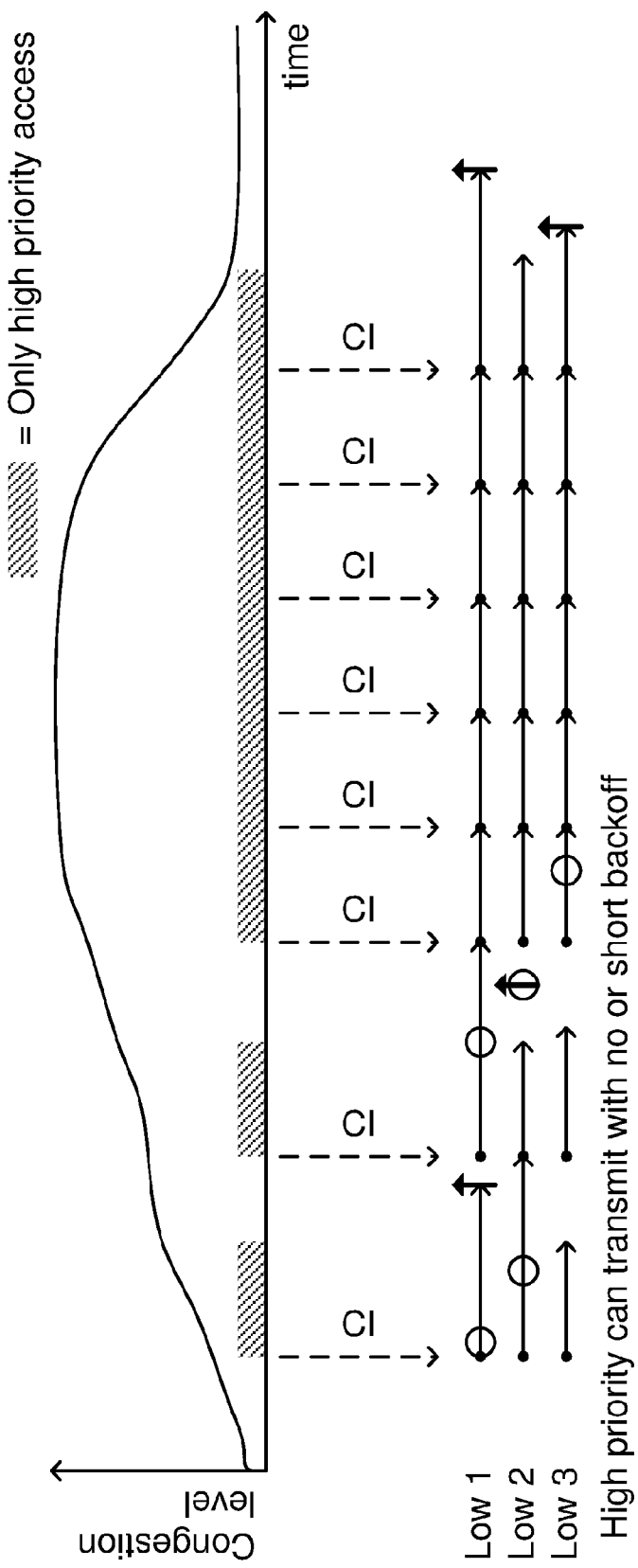
FIG. 7 is a schematic diagram illustrating an example of synchronized triggering of back-off procedures based on repeated congestion indications to handle a relatively longer period of congestion according to an embodiment of the proposed technology.

When considering a longer period of congestion, the problems with the prior art solution becomes more evident, as illustrated in FIG. 6 and FIG. 7.

As can be seen from FIG. 6, the backoff configurations in the prior art solution can only move transmissions to a future time and this time is limited by the length of the backoff. It is thus clear that it is not possible to avoid transmissions of low priority scheduling requests.

FIG. 7 is a schematic diagram illustrating an example of synchronized triggering of back-off procedures based on repeated congestion indications to handle a relatively longer period of congestion according to an embodiment of the proposed technology.

At medium congestion level the congestion indications are transmitted with a long interval between them and then low priority requests from UEs that happen to draw a short random backoff can still be transmitted. At high load or congestion level, congestion indications can be transmitted with shorter interval effectively inhibiting all low priority scheduling requests. If more than one priority level is configured the interval must be interpreted in relation to the backoff configuration for each priority level. The "long" interval in FIG. 7 may still block all scheduling requests for a priority level (not shown) that is lower than the one showed in FIG. 7.

With multiple priority levels, each backoff procedure and SR trigger is associated with a priority level, and the SR transmission typically only depends on the backoff procedure of the corresponding priority level.

Figure 8:
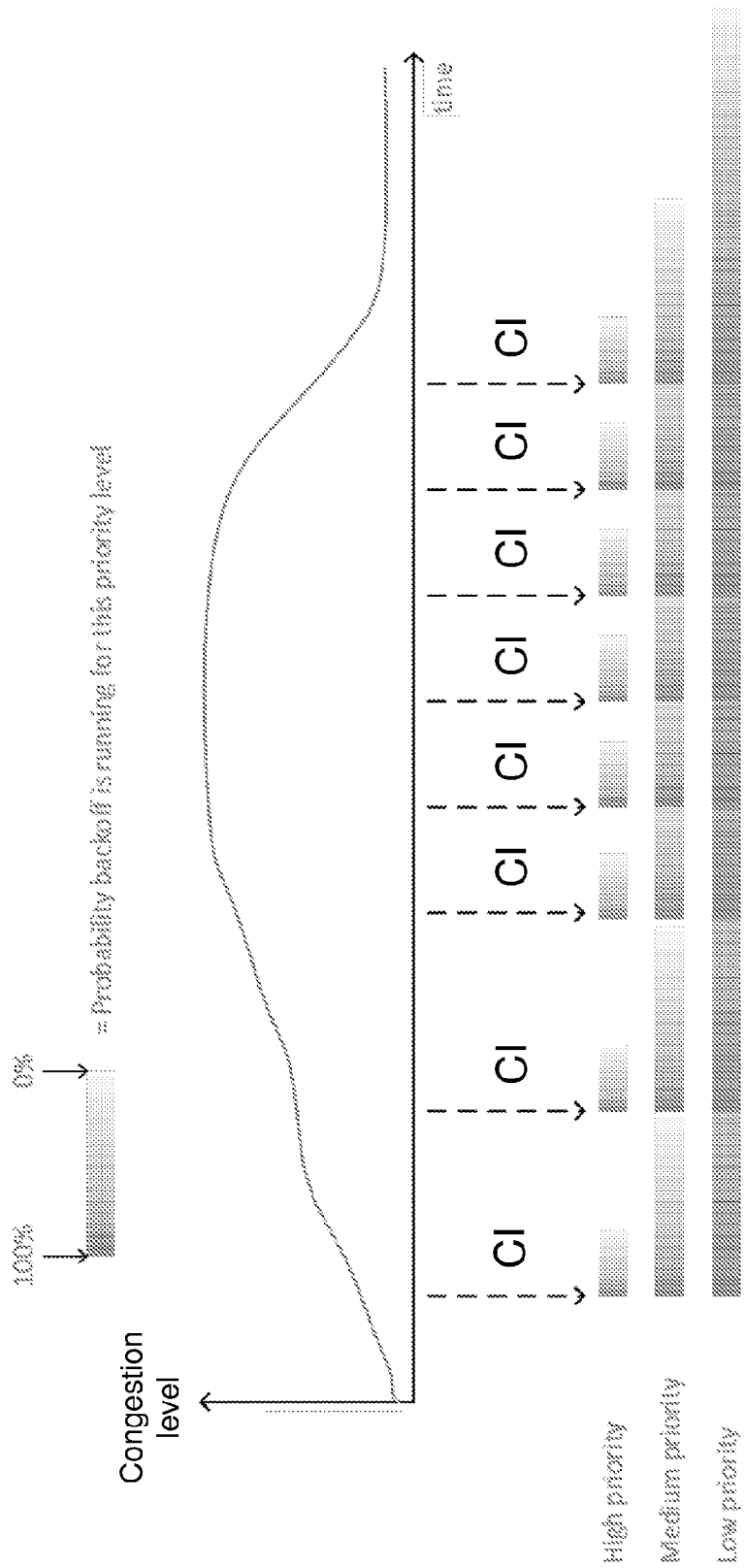
FIG. 8 is a schematic diagram illustrating an example of synchronized triggering of back-off procedures of different priority levels according to an embodiment.

FIG. 8 is a schematic diagram illustrating a particular example of synchronized triggering of back-off procedures of different priority levels according to an embodiment. In this particular example, a randomized backoff time is defined per priority level. For example, the backoff time may be defined by a constant value plus a random number within a given interval, where the constant value and the given interval are selected per priority level and regarded as priority-specific backoff parameters.

A particular, non-limiting example of how backoff parameters for a number N of priority levels, where p is a priority level from 1 to N.

Backoff time=$K\_p$+uniform random number in the range/interval from 0 to $B\_p$.

High priority, e.g. handover signaling, emergency calls:
$K\_p=0$; $B\_p=20$;
Medium priority, e.g. ordinary voice call (both media and SIP signalling)
$K\_p=20$; $B\_p=40$;
Low priority: e.g. web browsing
$K\_p=50$; $B\_p=500$;
In this example, the backoff parameters are given in ms.

In this way, there will be a certain probability, for each priority level, that the backoff is running, as schematically illustrated in FIG. 8.

Figure 9:
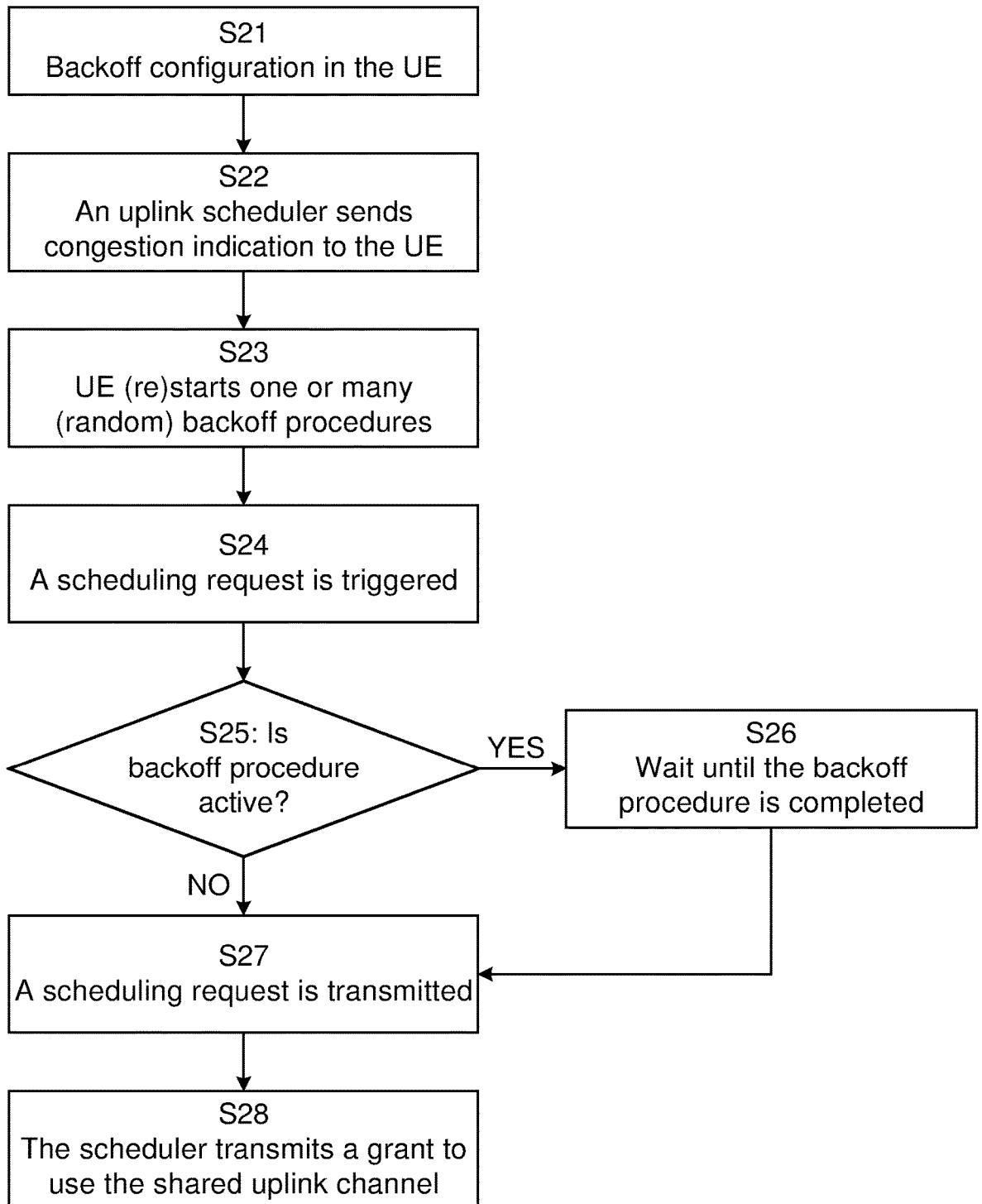
FIG. 9 is a schematic flow diagram illustrating a particular example of an overall procedure related to the allocation of an uplink grant based on a scheduling request that is deferred by a backoff procedure according to an embodiment.

FIG. 9 is a schematic flow diagram illustrating a particular example of an overall procedure related to the allocation of an uplink grant based on a scheduling request that is deferred by a backoff procedure according to an embodiment.

S21: Backoff configuration in the UE (optional)
Configurations of one or many backoff procedures are defined in the UE. The backoff procedure and/or the backoff parameters may be preconfigured in the UE, for example in the Universal Subscriber Identity Module (USIM), and then backoff parameters do not have to be transmitted to the UE. It is however possible that a procedure like Radio Resource Configuration (RRC) is used to configure the backoff parameters in the UE, e.g. when the UE connects to the network.

S22: An uplink scheduler transmits congestion indication to the UE(s)

The congestion indication could be transmitted in many ways: the most straightforward in LTE would probably be to use a broadcast PDCCH, but it would also be possible to use any other broadcast channel or it would be possible to piggy-back congestion indications on downlink data transmission(s).

S23: UE (re)starts one or many (random) backoff procedures

The main purpose with this step is to make the UEs wait longer until transmitting an SR when the load is high to reduce the load on the SR channel and the waiting time between scheduling request and grant to use the shared channel. To do this it is sufficient with a single backoff procedure.

Additional congestion indications received before completion may reconfigure and restart the backoff procedure.

If the congestion indication is a single bit and shorter response times for high priority data than low priority data is desired, multiple backoff procedures may be used.

Endless variations of backoff schemes are possible. A particular example with single bit is to do like this:
For each priority level p:
An initial backoff window, $B0\_p$, and maximum backoff window, $Bmax\_p$, are configured.
The backoff window, $B\_p$ is initialized to $B0\_p$.
When a congestion indication is received a random backoff is drawn with the range 0 and $B\_p$.
If another congestion indication is received before the backoff time has expired, the value of $B\_p$ is multiplied by a factor X and limited to $Bmax\_p$. Then the backoff procedure is restarted with a new backoff time drawn from the new range.

If the congestion indication has multiple levels it possible to let the level be part of the backoff calculations or to let it indicate for which priority levels the congestion indication applies. For example a congestion indication of "3", coded by two or more bits, could mean that only backoff procedures of priority level 3 or lower should be triggered by the congestion indication.

S24: A scheduling request is triggered
The triggering as such follows standard procedure. To support multiple priorities a priority level must be assigned to each request.

S25: Is backoff procedure active?
Basic functionality: Check whether the considered backoff procedure is active.

In case of multiple priorities this can be extended to: Check whether backoff procedure, corresponding to the priority level of the data that triggered the SR, is completed.

S26. Wait until the backoff procedure is completed
Basic functionality: If the backoff procedure is active wait and defer SR transmission until the backoff procedure is completed.

In case of multiple priorities this can be extended to: When a dedicated scheduling request is triggered it will not be transmitted until the backoff procedure, corresponding to the priority of the data that triggered the SR, is completed.

It would be possible to include a random mechanism also here, e.g. to use a single backoff process, but subtract different random numbers from the backoff time here based on priority.

S27: A scheduling request is transmitted

Just like in the ordinary case: The scheduling request will be transmitted on an uplink channel. In the example of LTE, this is either a random access channel or a dedicated scheduling request channel.

S28: The scheduler transmits a grant to use the shared uplink channel

Basic functionality: The scheduler operates according to any standard procedure.

Optionally, the scheduler could at this stage utilize information about the backoff procedure to determine which of the UEs that have higher priority. It is for example possible to determine that a SR that is received within a certain time window with relation to the congestion indications must be triggered by a high priority request.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology, there is provided a device configured to enable load control related to scheduling requests for uplink grants in a wireless communication system. The device is configured to transmit a congestion indication to a group of wireless communication devices for synchronized triggering of backoff procedures in the wireless communication devices.

By way of example, the device may be configured to transmit repeated congestion indications wherein a length of a time interval between repeated congestion indications is adapted according to a level of congestion.

For example, the device may be configured to transmit congestion indications with a shorter length of the time interval when the level of congestion is higher compared to when the level of congestion is lower.

Preferably, the device is configured to simultaneously transmit the congestion indication to the group of wireless communication devices, e.g. by broadcasting or multicasting.

In a particular example, the device is configured to determine a priority level of an event that triggered a scheduling request based on the time between the most recently transmitted congestion indication and reception of the scheduling request, and configured to determine when to grant access to a shared uplink channel at least partly based on the determined priority level. This may be useful for decide which user(s) should be granted access to the shared uplink channel and in which order, as previously discussed.

Figure 10:
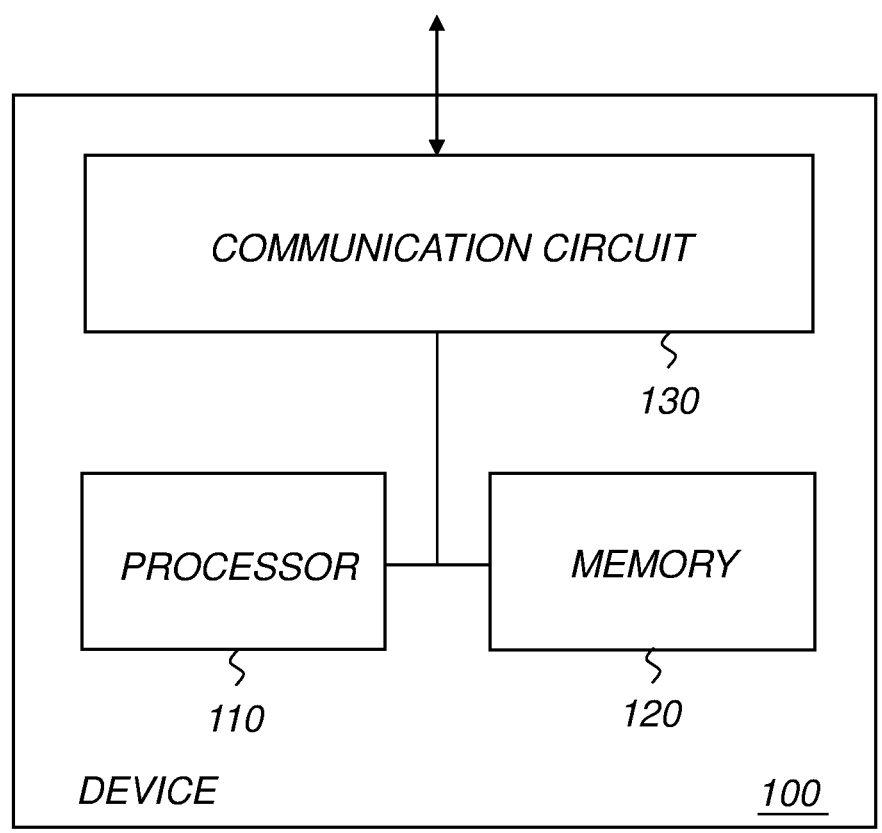
FIG. 10 is a schematic block diagram illustrating an example of a device configured to enable load control related to scheduling requests for uplink grants according to an embodiment.

FIG. 10 is a schematic block diagram illustrating an example of a device configured to enable load control related to scheduling requests for uplink grants according to an embodiment. In this particular example, the device 100 comprises a processor 110 and a memory 120, the memory 120 comprising instructions executable by the processor 110, whereby the processor is operative to enable load control related to scheduling requests.

Optionally, the device 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 11:
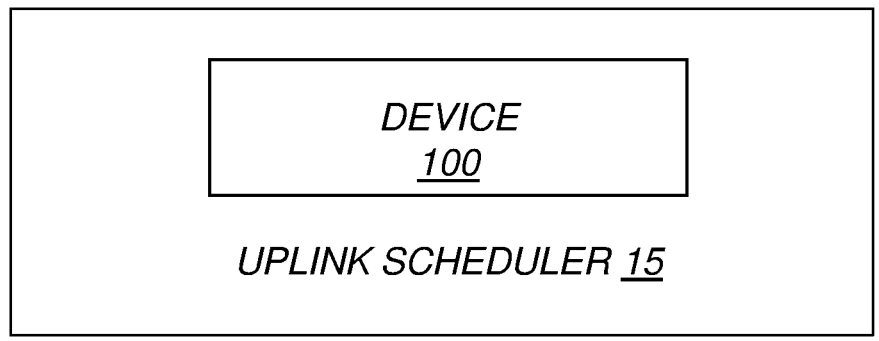
FIG. 11 is a schematic block diagram illustrating an example of an uplink scheduler according to an embodiment.

FIG. 11 is a schematic block diagram illustrating an example of an uplink scheduler according to an embodiment. In this example, the uplink scheduler 15 comprises a device 100 according to any of the relevant embodiments.

Figure 12:
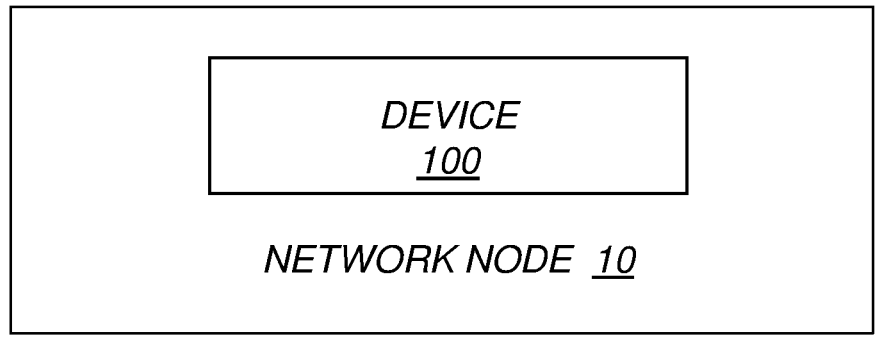
FIG. 12 is a schematic block diagram illustrating an example of a network node according to an embodiment.

FIG. 12 is a schematic block diagram illustrating an example of a network node according to an embodiment. In this example, the network node 10 comprises a device 100 according to any of the relevant embodiments. By way of example, the network node 10 is a base station.

According to another aspect, there is provided a wireless communication device in a wireless communication system. The wireless communication device is configured to receive a congestion indication. The wireless communication device is also configured to initiate a backoff procedure based on the received congestion indication to defer transmission of scheduling request(s) until the backoff procedure is completed.

In other words, the wireless communication device is configured to back off from transmission of a scheduling request during a backoff time period, and the backoff procedure is completed when the backoff time period has expired.

In a particular example, the wireless communication device is configured to receive more than one congestion indication and to restart the backoff procedure based on each congestion indication.

Optionally, the wireless communication device may be configured to initiate at least two backoff procedures based on the received congestion indication, wherein the at least two backoff procedures are configured to operate based on different backoff parameters regulating the backoff time period For example, the at least two backoff procedures may be associated with different priority levels corresponding to different priority levels of data triggering the scheduling request(s).

Figure 13:
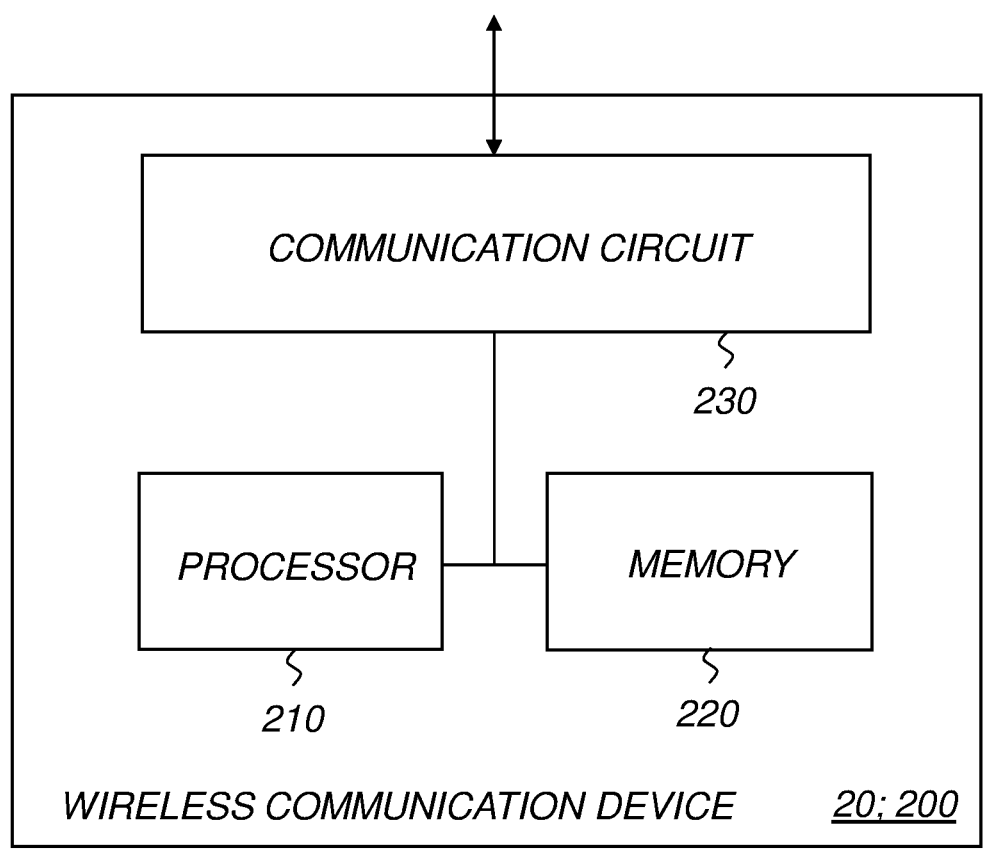
FIG. 13 is a schematic block diagram illustrating an example of a wireless communication device according to an embodiment.

FIG. 13 is a schematic block diagram illustrating an example of a wireless communication device according to an embodiment. In this particular example, the wireless communication device 200 comprises a processor 210 and memory 220, the memory 220 comprising instructions executable by the processor 210, whereby the processor 210 is operative to initiate a backoff procedure.

Optionally, the device 200 may also include a communication circuit 230. The communication circuit 230 may include functions for wired and/or wireless communication with other devices and/or network nodes in the network. In a particular example, the communication circuit 230 may be based on radio circuitry for communication with one or more other nodes, including transmitting and/or receiving information. The communication circuit 230 may be interconnected to the processor 210 and/or memory 220. By way of example, the communication circuit 230 may include any of the following: a receiver, a transmitter, a transceiver, input/output (I/O) circuitry, input port(s) and/or output port(s).

It is also possible to provide a solution based on a combination of hardware and software.

Figure 14:
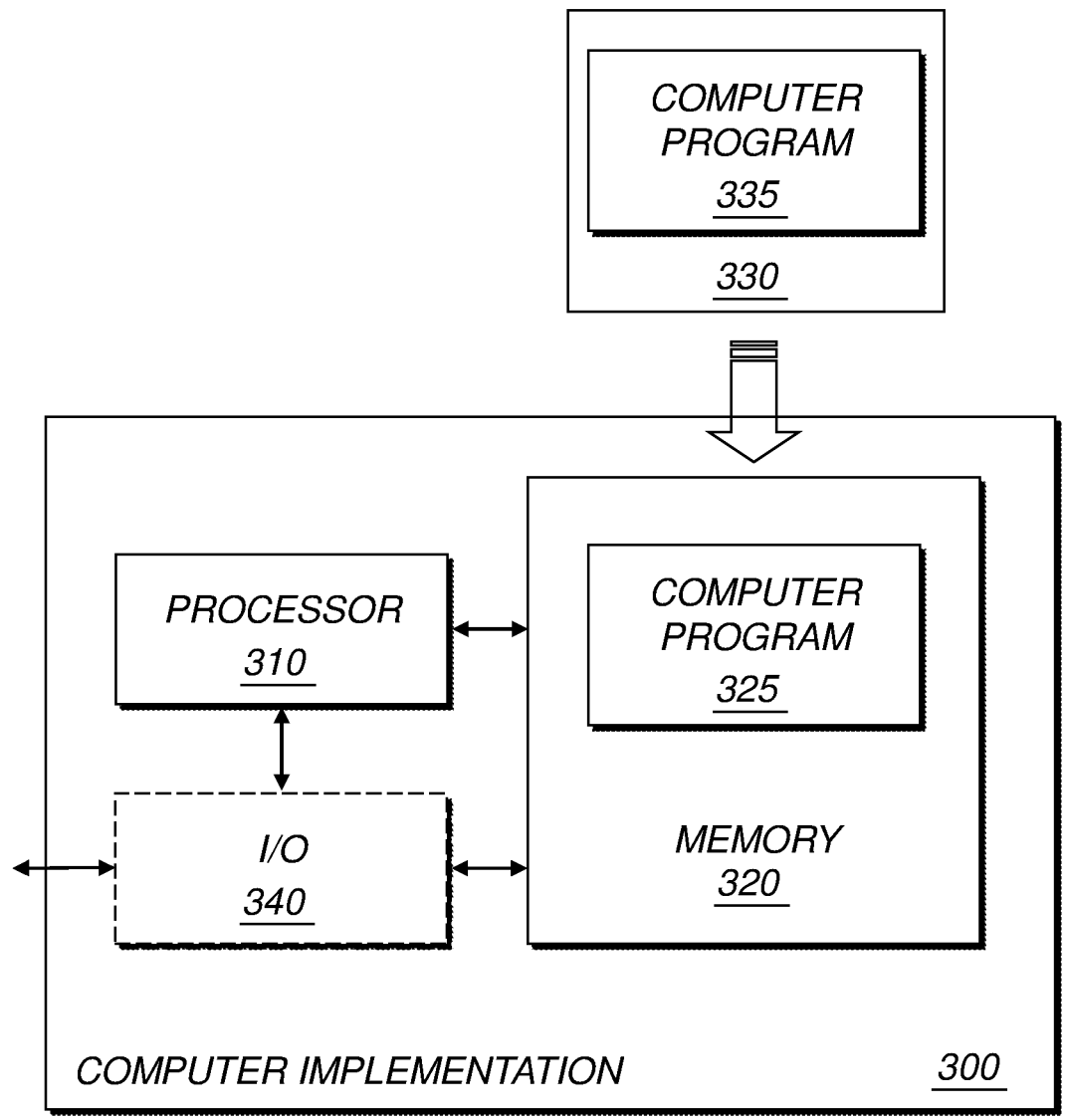
FIG. 14 is a schematic block diagram illustrating an example of a computer implementation according to an embodiment.

FIG. 14 is a schematic diagram illustrating an example of a computer-implementation 300 according to an embodiment. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

The processing circuitry does not have to be dedicated to only execute the above-described steps, functions, procedure and/or blocks, but may also execute other tasks.

In a particular embodiment, the computer program 325; 335 comprises instructions, which when executed by at least one processor 310, cause the processor(s) 310 to:
generate a congestion indication, and
output the congestion indication for transmission to a group of wireless communication devices for synchronized triggering of backoff procedures in the wireless communication devices.

In another particular embodiment, the computer program 325; 335 comprises instructions, which when executed by at least one processor 310, cause the processor(s) 310 to:
read a congestion indication, and
initiate a backoff procedure based on the congestion indication to defer transmission of scheduling request(s) until the backoff procedure is completed.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 15:
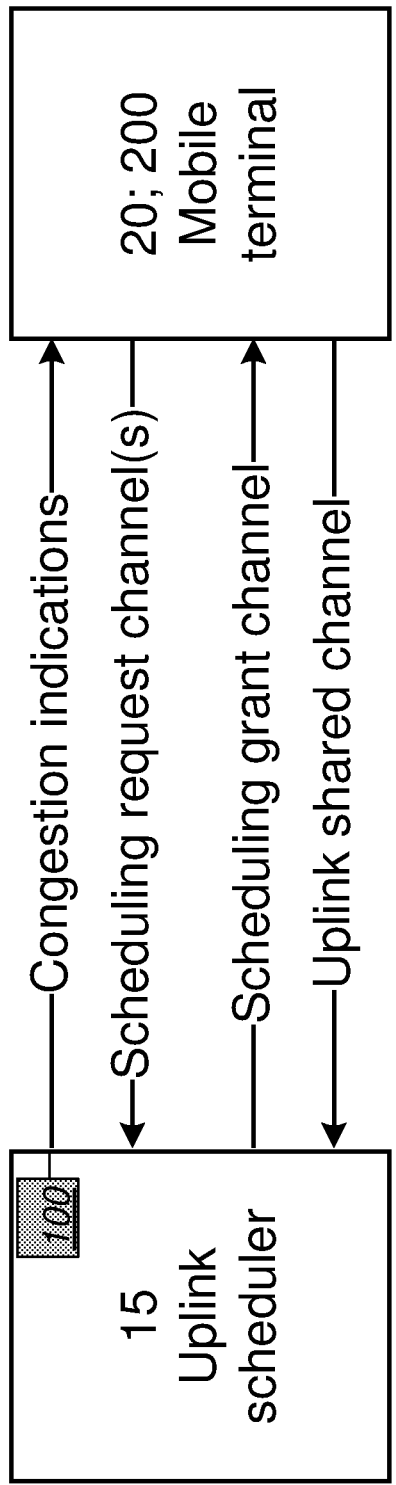
FIG. 15 is a schematic diagram illustrating a particular example of signaling between an uplink scheduler and a mobile terminal according to an embodiment.

FIG. 15 is a schematic diagram illustrating a particular example of signaling between an uplink scheduler and a mobile terminal according to an embodiment.

The uplink scheduler 15 is normally responsible for performing medium access control on a shared channel.

The mobile terminal 20; 200 wants to transmit data on the shared channel that is controlled by the scheduler 15. When data needs to be transmitted (could be either signaling within the radio system or application data) and it has no grant to transmit on the shared channel it must first transmit a scheduling request to the scheduler 15 on at least one of the scheduling request channel(s).

However, in order to enable efficient load control related to scheduling requests, the proposed technology provides a device 100 that is configured to transmit congestion indication(s) to wireless communication devices such as mobile terminals 20; 200 for synchronized triggering of backoff procedures.

This means that transmission of scheduling request(s) is deferred until one or more backoff procedures in the mobile terminal 20; 200 is completed, as previously explained.

Once a scheduling request is received by the uplink scheduler 15, the uplink scheduler allocates transmission resources, if possible, and sends a grant to the mobile terminal 20; 200 on the scheduling grant channel(s).

Data may then finally be transmitted between the mobile terminal 20; 200 and the network side on the uplink shared channel.

In the example of LTE, the scheduler is logically part of an eNB, but it is possible to have a single coordinated scheduler that handles many eNB. In this case the scheduler and the entity that transmits the congestion indication may be in different physical locations.

Figure 16:
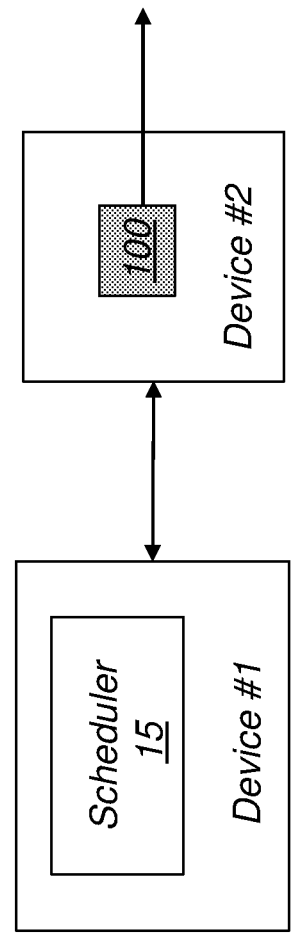
FIG. 16 is a schematic block diagram illustrating an example of an implementation wherein the scheduler is located in a first device and the entity responsible to transmit the congestion indication(s) is located in a second device.

FIG. 16 is a schematic block diagram illustrating an example of an implementation wherein the scheduler is located in a first device and the entity responsible to transmit the congestion indication(s) is located in a second device. It should thus be understood that the scheduler may be located in a physical device and the actual transmitter of the congestion indication may be located in another physical device, as schematically illustrated in FIG. 16.

It is also possible that the congestion indication is transmitted from another device than the device receiving the uplink data and/or control channel(s).

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 17:
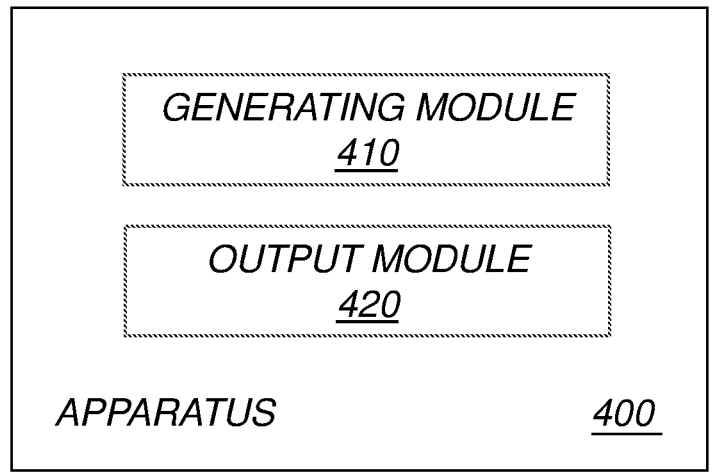
FIG. 17 is a schematic block diagram illustrating an example of an apparatus for enabling load control related to scheduling requests for uplink grants according to an embodiment.

FIG. 17 is a schematic block diagram illustrating an example of an apparatus for enabling load control related to scheduling requests for uplink grants according to an embodiment. The apparatus 400 comprises a generating module 410 for generating a congestion indication, and an output module 420 for outputting the congestion indication for transmission to a group of wireless communication devices for synchronized triggering of backoff procedures in the wireless communication.

Figure 18:
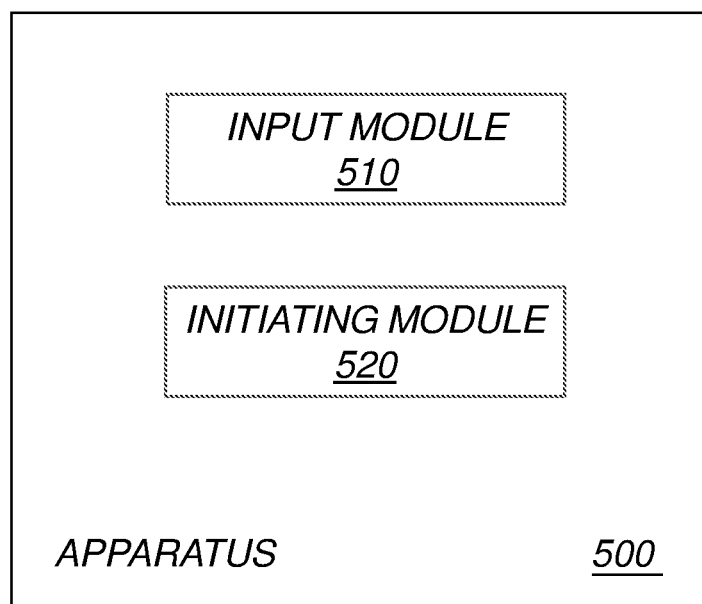
FIG. 18 is a schematic block diagram illustrating an example of an apparatus for supporting operation of a wireless communication device according to an embodiment.

FIG. 18 is a schematic block diagram illustrating an example of an apparatus for supporting operation of a wireless communication device according to an embodiment. The apparatus 500 comprises an input module 510 for receiving a congestion indication, and an initiating module 520 for initiating a backoff procedure based on the received congestion indication to defer transmission of scheduling request(s) until the backoff procedure is completed.

Alternatively it is possible to realize the module(s) predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for enabling load control related to scheduling requests for uplink grants in a wireless communication system, the method comprising:

transmitting a congestion indication to a group of wireless communication devices for synchronized triggering of backoff procedures that enables deferring, in each of the wireless communication devices, transmission of scheduling requests until one or more backoff procedures in the wireless communication devices are completed, wherein the synchronized triggering is achieved by simultaneously transmitting the congestion indication to the group of wireless communication devices; and determining a priority level of an event triggered a scheduling request based on a time between a most recently transmitted congestion indication and reception of the scheduling request for determining when to grant access to a shared uplink channel;

wherein congestion indications are transmitted with a shorter length of a time interval between repeated transmissions of congestion indications when a level of congestion is higher compared to when the level of congestion is lower.

2. A device configured to:

enable load control related to scheduling requests for uplink grants in a wireless communication system; and transmit a congestion indication to a group of wireless communication devices for synchronized triggering of backoff procedures that enables deferring, in each of the wireless communication devices, transmission of scheduling requests until one or more backoff procedures in the wireless communication devices are completed, wherein the synchronized triggering is achieved by simultaneously transmitting the congestion indication to the group of wireless communication devices; and determining a priority level of an event triggered a scheduling request based on a time between a most recently transmitted congestion indication and reception of the scheduling request for determining when to grant access to a shared uplink channel;

wherein the device is further configured to transmit congestion indications with a shorter length of a time interval between repeated congestion indications when a level of congestion is higher compared to when the level of congestion is lower.

3. The method of claim 1, wherein repeated congestion indications are transmitted and wherein a length of a time interval between repeated transmissions of congestion indications is adapted according to a level of congestion.

4. The device of claim 2, wherein the device is further configured to transmit repeated congestion indications and wherein a length of a time interval between repeated congestion indications is adapted according to a level of congestion.

* * * * *